United States Patent

[11] 3,577,125

[72] Inventor Jack G. Frisbie
Great Falls, Va.
[21] Appl. No. 767,973
[22] Filed Oct. 16, 1968
[45] Patented May 4, 1971
[73] Assignee International Telephone & Telegraph Corporation
New York, N.Y.

[54] MONOLITHIC ELECTRONIC SWITCHING NETWORK HAVING VARIABLE VOLTAGE LEVELS
9 Claims, 6 Drawing Figs.

[52] U.S. Cl. .......... 340/166
[51] Int. Cl. .......... H04q 1/00
[50] Field of Search .......... 340/166

[56] References Cited

UNITED STATES PATENTS 3,168,722 2/1965 Sanders .......... 340/166X
3,201,520 8/1965 Bereznak .......... 340/166X
3,321,745 5/1967 Mansuetto .......... 340/166
3,387,271 6/1968 Chernon .......... 340/166
3,465,292 9/1969 Schilling .......... 340/166

*Primary Examiner*—Harold I. Pitts
*Attorneys*—C. Cornell Remsen, Jr., Rayson P. Morris, W. J. Baum, Percy P. Lantzy, J. Warren Whitesel and Delbert P. Warner

ABSTRACT: The invention relates to a solid state switching matrix, a plurality of which may be cascaded to provide a switching network. Various means are disclosed for controlling the amount of energy required to fire a diode in one matrix and the amount of energy passing through the diode after it has fired. By the selection of proper characteristics, the diodes in each state may be made to fire on less energy than was required to fire the diodes in the next preceding state. This way, the diodes may be made to scan idle points in the network without causing offensive levels of fan-out current to build up.

INVENTOR
JACK G. FRISBIE

BY

ATTORNEY

MONOLITHIC ELECTRONIC SWITCHING NETWORK HAVING VARIABLE VOLTAGE LEVELS

This invention relates to switching networks and more particularly to electronic switching systems including a plurality of cascaded matrices, each of which is constructed, at least in part, on a single monolithic chip of semiconductor material. This is an improvement over U.S. Pat. No. 3,204,044 granted Aug. 31, 1965 to V. E. Porter entitled "Electronic Switching Telephone System," and U.S. Pat. No. 3,321,745 granted May 23, 1967 to N. V. Mansuetto et al., entitled, "Semiconductor Block Having Four Layer Diodes In Matrix Array." Both of these patents are assigned to the assignee of the subject invention.

Electronic switching matrices comprising PNPN diode crosspoint equipment have been used to interconnect telephone lines in the manner disclosed in the Porter patent. However, all of the parts of such equipment were discrete elements assembled by hand labor which inherently limits the lower cost levels of the switching systems. In an effort to overcome these cost barriers, attempts have been made to provide monolithic semiconductor devices incorporating the electronic elements required to make the network operate properly. However, when such attempts were made, it has proven necessary to provide very complex switching techniques, and associated discrete elements have still been required.

Accordingly, an object of this invention is to provide new and improved electronically controlled switching matrices.

Another object of this invention is to provide electronic switching systems made from monolithic semiconductor devices.

In accordance with one aspect of this invention, a plurality of electronically controlled crosspoints are arranged in horizontal and vertical multiples on a monolithic substrate of semiconductor material to provide switching matrices which may be cascaded to form a multistage switching network. Energy is transferred down the cascade to each successive matrix in a steplike manner in order to provide for the exploration of alternative paths through the pertinent matrix before the crosspoints in a preceding matrix can turn off.

The invention includes three embodiments which provide alternative methods of arriving at the energy steps. A first embodiment controls the speed at which diodes turn on and off. Thus, primary matrix diodes turn on and remain on long enough for a number of secondary matrix diodes to turn on and off. Similarly each secondary matrix diode turns on for a period which is long enough for a tertiary diode to turn on, if it is then marked as the end of a desired switch path. A second embodiment involves a control over the switching current levels. When primary matrix diodes turn on, they pass a large current which is adequate to turn on a limited number of secondary matrix diodes. Each secondary diode passes a smaller amount of current which is adequate to turn on at least one tertiary diode, if it is then marked as available. A third embodiment utilizes a monolithic crosspoint structure including at least one supplementary device, such as a zener diode type of device which regulates the switching level.

In any of these embodiments, preselected multiples are marked simultaneously in first and last stages of such a switching network. Electronic devices at idle, marked crosspoints fire in limited numbers in a first stage matrix and hold on while there is an exploration through idle crosspoints in the next stage matrices. The process repeats at each succeeding matrix. The first path to be completed through the network draws all available current to hold the fired diodes in that path, and all competing paths are self-releasing or self-blocking, depending upon a termination of such current flow. The successive steps of energy used to control the crosspoints in each matrix are adequate to enable an exploration of that matrix and all succeeding matrices before the diode in the preceding matrix turns off.

The above mentioned and other objects of this invention together with the manner of obtaining them will become more apparent and the invention itself will be best understood by making reference to the following description of an embodiment of the invention taken in conjunction with the accompanying drawings in which:

FIG. 1 schematically shows the circuit of a preferred embodiment of a switching network that is made in accordance with the subject invention;

FIG. 2 symbolically shows how energy is applied to successive matrices in a steplike manner;

Figures 1, 2, 3, 4, 5, 6:
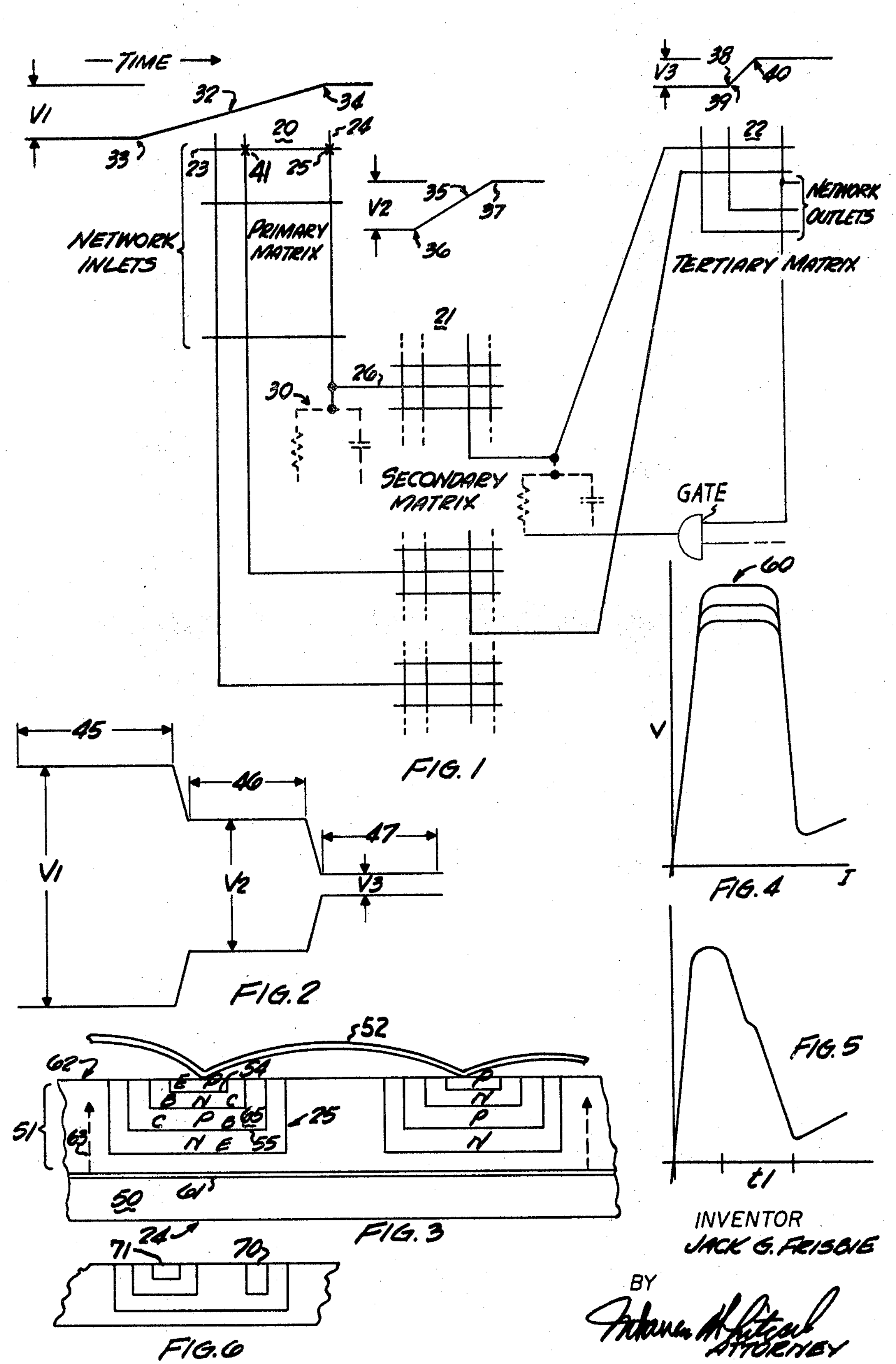
FIG. 3 is a cross section of a monolithic chip of semiconductor material showing how current may be controlled to provide the step energy.
FIG. 4 is a voltage vs. current curve showing the current flow that results from a zener effect which provides the step energy to enable the exploration.
FIG. 5 shows how the firing time may be varied to provide the step energy.
FIG. 6 shows how extra components may be incorporated into a crosspoint in order to form a steplike transfer of energy.

The crosspoint described herein has the characteristic of a PNPN or four layer diode. This is a semiconductor device that has alternating positive and negative sections with the two inside sections floating between the two outside sections which have electrodes coupled thereto.

When the diode is in an "off" condition, the center junction is reversely biased, and the diode is electrically similar to a back biased diode. Very little current flows between the electrodes. As the potential is increased across the outside layers, there continues to be very little current through the diode. However, when the applied potential reaches a certain firing voltage, current begins to flow with an avalanche and the diode exhibits a negative impedance characteristic. The exact firing voltage depends somewhat upon the waveform of the applied potential. Thus, if a slow rising voltage is applied, the diode fires at a much higher peak voltage than when a fast rising waveform is applied. The terms "rate sensitive" and "rate effect" are used to describe this change of firing voltage characteristic.

After the diode has fired, a very low resistance characteristic appears across the connected electrodes. The voltage drop across the two outside layers falls to a potential where the two intermediate layers of the diode are flooded with charge carriers. Then, the central or back-biased junction virtually disappears. As a result, there are two forwardly biased junctions and no back biased junction; whereupon, the four layer diode functions as a forwardly biased diode. As long as there is a minimum holding current through the diode, it continues to exhibit an extremely low resistance. However, if the current falls below the holding level, the diode reverts to its "off" condition and is again similar to a back biased diode.

In the Porter patent, these diodes are discrete elements solder connected across an array of horizontal and vertical busses. First, a potential is applied to the horizontal bus where a path enters the network. The applied potential increases until it reaches the voltage where a diode will fire. After a diode fires, the potential on the horizontal bus appears as a busy potential on the vertical bus to reverse bias all other diodes connected thereto. In a somewhat similar manner, the firing potential on the horizontal bus drops toward the vertical bus potential so that no other diode connected to the horizontal can fire.

In construction, the Porter-type network includes a plurality of cascaded matrices 20, 21, 22, (FIG. 1). Each matrix has horizontal and vertical multiples including busses such as 23, 24, for example, which are arranged to provide a plurality of intersecting crosspoints. At each crosspoint, there is a crosspoint switch (such as 25) having the desired characteristics (such as those of a PNPN diode). This crosspoint switch fires or breaks down when a potential difference of sufficient magnitude is applied across the horizontal and vertical busses 23, 24 associated therewith. The cascaded matrices are arranged to provide a multistage switching network. These matrices are interconnected by wires which connect the outlets (vertical) of one stage to the inlets (horizontal) of the next succeeding stages.

In operation, when there is a need for a switch path, a horizontal multiple (such as 23) is marked with a potential which is of sufficient magnitude to break down or fire at least one connected four layer diode (such as at the crosspoint 25) if the vertical multiple 24 associated therewith are then idle, i.e. marked by ground potential. When the diode fires, the resistance across the corresponding crosspoints virtually disappears, and a potential from the marking source is passed on to an associated horizontal multiple 26 in the next switching stage. The same process is repeated at every switching stage.

An important feature of the invention is that the crosspoints fire in a random manner. Therefore, in theory, it is possible that all diodes connected between an idle vertical multiple and a marked horizontal multiple might fire at the same instant when the voltage on the horizontal multiple reaches a firing potential relative to the idle potential. However, this assumes that all of the diodes have similar characteristics. In actual practice, it is almost impossible for all diodes to have identical characteristics. Thus, it is almost certain that one, or perhaps a few, diodes will fire in each matrix before the others—depending upon many variables, such as: diode and circuit characteristics, existing charges, stray currents and potentials, prior traffic conditions, and the energy of the marking potential as compared with the firing characteristics of the diodes. In any event, after a diode or diodes fire, the idle marking ground on the vertical multiple lowers the marking potential on the intersecting horizontal multiple to keep the other diodes connected to the same horizontal multiple from firing.

For controlling the firing of diodes as the marking signal is passed, stage-by-stage, through the cascaded matrices, Porter uses a resistor-capacitor network (as shown at 30) coupled to each vertical bus. This network performs four primary functions. First, it speeds the rise time of the firing potential appearing on the vertical bus when a diode associated therewith fires. This faster rise time fires the diodes in the next matrices at a lower rate sensitive voltage. Second, it draws current until it is charged and then the current stops to cause all fired crosspoints to extinguish themselves if a path is not yet completed. Third, it slows the return of an idle potential to the vertical bus to prevent the diodes from firing in a reverse direction on the rate effect at that time. Fourth, the capacitors supply power for firing the diode in the next succeeding stage and storing power over a period of time.

The present invention is designed to provide a Porter type switching network through a use of many semiconductor crosspoint devices made in a single monolithic chip. Each chip corresponds to an entire matrix; for example, one chip might replace matrix 20, another might replace matrix 21, and yet another might replace matrix 22. Thus, there should be as nearly a direct substitution of equivalent devices as it is possible to so make a substitution. Unfortunately, it is not always possible to substitute equivalents in such a direct manner, because there are differences resulting from the structure and methods of fabrication. Accordingly, the invention provides for the modifications required to make an integrated switching network on a monolithic chip.

Above each of the switching stages, 20, 21, 22, there is a curve somewhat generally representing a switching principle. The symbology of the curves 32, 35, 38 is not intended to convey a rigorous amount of information. Instead, it is generally intended to show the relative firing voltage, rise time, and other timing relationships. The fact that the curves end at a high level (as at 34) indicates that the diode is precluded from refiring immediately because charge carriers are stored on the junction capacitances. Thus, energy must be drained away from junctions capacitances in the semiconductor material before the diode can refire. While the energy level stored on the junction capacitance of a just fired and starved diode, at say diode 25, is continuing at a high level, another horizontal multiple primary diode fires, as at 41, to institute another search.

Thus, a curve 32 shows that a primary matrix diode should fire at a high, slow rising voltage V1, and it must remain ON for the relatively long period 33, 34, during which paths through both secondary and tertiary matrices 21, 22 are being explored. The curve 35 shows that the secondary matrix diodes must fire at a lower, faster rising voltage V2, and remain on for a shorter period of time 36, 37 required to explore all paths through the tertiary matrix 22. However, the secondary matrix diodes do not stay on as long as the primary matrix diodes stay on. Quite the contrary, it is preferable for several secondary matrix diodes to turn on and off during the time 33, 34, while the associated primary matrix diode remains on. The curve 38 shows that the tertiary diode fires at a still lower and faster rising voltage V3 and stays on for a very short period of time 39, 40—as compared with the ON time of the associated secondary diode. Thus, several tertiary diodes turn on and off during the period 36, 37 while the associated secondary diode is feeding current. The foregoing assumes only that a search is being made through three of an undisclosed number of stages. If the tertiary matrix outlet is at the terminal of the network path, no tertiary diode would ever turn on unless it is the marked diode at the desired end point.

It is well known that a wire has an inherently capacitive and resistive nature per unit length. When the crosspoint components become as small as they are in monolithic devices of the component, the values of the vertical bus RC network 30 also become smaller, They become so small that the distributed capacitance and resistance of the wire used to join the diodes on the chip is adequate to provide a vertical bus control network equivalent to that of the circuit 30. Thus, an important aspect of the invention is to select a bonding wire (deposited, diffused resistance element, or metallized deposition) which has inherent characteristics required for matching the needs of the diode.

In keeping with an aspect of the invention, the individual diodes in each succeeding stage are adapted to require progressively smaller amounts of energy to fire and hold momentarily, as shown in FIG. 2 (which is merely drawn to illustrate a point—it is not drawn to any particular scale of values). Thus, the diodes in the primary matrix 20 require high firing voltages and transmit a large amount of energy 45. The diodes in the secondary matrix 21 require lower firing voltages V2 and transmit a smaller amount of energy 46. The diodes in the tertiary matrix 22 require an even lower firing voltages V3 and transmit a still smaller amount of energy 47. If there are a greater number of stages, the same reduced step of energy is used at each stage. The last stage diodes are marked at the desired terminal. Therefore, only one diode will fire there.

As disclosed in my copending application (joint with W. K. C. Yuan and J. G. Bull), entitled "Electronic Switching System," Ser. No. 523,999, filed on Feb. 1, 1966, and assigned to the assignee of this invention, the secondary matrices are gated or armed to allow only the convergence of a network path extending toward an allotted outlet. This gating requires any single device to drive only one other device as a connection is propagated through the matrix. However, when not using this technique, another viewpoint is that the energy put into the matrix 20 via a fired primary diode must be sufficient to support several secondary diode firings at 21, and the energy put into the matrix 21 via each fired secondary diode must be sufficient to support several tertiary matrix diode firings at 22. In a negative sense, the energy applied through each succeeding stage diode must be limited so that it will not support more than a few diodes in the next matrix. Otherwise, offensive levels of fan-out current might buildup.

When discrete components are used, it is relatively more easy to provide the described characteristics. When attempts are made to provide a monolithic unit incorporating an entire matrix, it becomes necessary to modify the manufacturing process in order to accommodate the above described requirements, i.e. the resistance-capacitance of the vertical bus circuits is provided by the distributed resistance and capacitance of the internetwork wiring; the diodes in each succeeding network stages should require successively smaller energy steps; and energy should be controlled at each stage in order to prevent an excessive number of diodes from firing simultaneously to buildup offensive levels of fan-out current.

These requirements may be met by manipulating the time, voltage, or current threshold levels. Obviously, current and voltage go together. Therefore, any references to voltage or current are to be understood as references to the more appropriate one of the parameters and not as an exclusion of the nonmentioned parameters.

FIG. 3 shows part of a monolithic semiconductor chip including a substrate 50 having an epitaxial layer 51 grown thereon. Through a number of successive oxidation, etch, and diffusion steps, a number of P and N layers are diffused into the epitaxial layer 51 in order to form a number of separate PNPN diodes. Thereafter, suitable leads (such as 52) are chisel bonded or otherwise attached to the diodes in order to form the matrix connections. FIG. 3 may then be thought of as showing vertical 24 in FIG. 1. The wire 52 is part of the first horizontal 23 in the matrix. By inspection, it is seen that the diode 25 is then at the intersection of horizontal 23, and vertical 24.

Many people tend to think of a PNPN diode as a circuit comprising two analogous transistors connected in a back-to-back arrangement. While I do not vouch that the analogous circuit provides a tool for a completely rigorous analysis of all aspects of such a diode. I do find it instructive for some purposes. Accordingly, FIG. 3 (diode 25) includes the letters E, B, C reading downwardly from top to bottom and upwardly from bottom to top, to identify the layers which appear to function as emitter, base and collector of the two transistors, respectively. Thus, there are two emitter-base junctions 54, 55 which may have characteristics that are controlled separately during manufacturing.

The efficiency of the emitter-base junctions 54, 55 depends upon a number of things which are well known to those who are skilled in the art. For example, efficiency depends upon the geometry of the junction, the kinds and strengths of the doping material used, the resistivity of the basic semiconductor material in which diffusion occurs, carrier lifetime, and other things.

The relative emitter junction efficiencies may be selected so that there is a predetermined zener effect when the diode turns on. Thus, because one emitter is less efficient, the applied voltage must build to a higher lever 60 before the diode breaks down. But, when it does, there is a very rapid increase in current for a period of time which is much longer than is found in more conventional diodes. This gives a flat topped characteristic curve. Also, it allows a faster transfer of a greater amount of energy. Finally, the top 60 of the curve is shown at several levels. It is important that the diodes have some variation in their switching voltage so that the turn on time of the diodes will fan out in time, thus distributing current requirements over time and preventing the excessive fan-out current levels.

I am able to provide the controlled zener effect in several ways. I begin the construction of my monolithic chip by growing an epitaxial boundary layer 61 upon the substrate 50 in order to isolate the diodes from the substrate. Then, semiconductive material is grown above the boundary layer with an internal resistivity characteristic reducing in a smooth gradient from a very high resistance at the boundary layer to a much lower resistance at the top 62 of the material. An arrow 63 ending in dashed lines is intended to symbolically show this reducing resistive gradient. An any given instant, the effective limits of the resistivities of this gradient are subject to dynamic changes depending, at least in part, upon the current density at the time.

The junctions are then diffused into the semiconductor material with a time cycle which determines both the area of the junction and the thickness of the layer. This diffusion time cycle, in turn, helps set the relative efficiencies of the various characteristics of the device. By varying these relative efficiencies, the junction 54 is made less efficient than the junction 55. In the primary matrix 20, for example, the P-layer 65 (FIG. 3) might be a certain thickness in the epitaxial semiconductor layer 51. The same P-layer in the secondary matrix 21 and the tertiary matrix 22 may be made progressively thinner. For example, without being specific, the layer 65 could be thought of as 3X thick in the primary matrix 20, 2X thick in the secondary matrix 21, and 1X thick in the tertiary matrix 22.

The degree of the efficiency differential establishes the firing time of the diode so that the diodes in each succeeding stage may be made to fire faster. It also establishes the amount of energy passed through the diode to set the energy level step, as shown in FIG. 2. The capacitance and resistance of the wire between the matrices determines the rise time of the voltage pulse passed from one matrix to the next.

With the foregoing thoughts in mind, I have provided three embodiments of the invention depending upon three different characteristics of the devices. Alternatively these three different characteristics may be combined to provide a single embodiment depending in varying degrees upon combinations of these three characteristics.

According to the first embodiment, the turn on time of the diodes is varied so that a primary matrix diode turn on time requires a long period of time, a secondary matrix diode turn on time requires an intermediate period of time, and a tertiary matrix diode turn on time is a short period of time. This effect is controlled primarily by base width, minority carrier lifetime, and material resistivity. The turn on time is shown in the area designated "*tl*" in FIG. 5.

According to a second embodiment of the invention, the various efficiencies of the diode junctions are varied to produce greater or lesser zener effects in the diodes. One way of doing this is to provide one emitter-base junction 54 with a high efficiency and another 55 with a low efficiency. Another way is to diffuse multiple anodes (as at 70, FIG. 6) in the diode. This enables a diode associated with one anode to switch as a zener diode and a diode associated with another anode to switch as a PNPN diode with anode to anode DC current flow modulated by voice signals. Moreover, the multidiffusion device introduces an internal resistance in the total crosspoint device which both controls current flow and device reaction time. This way the amount of current flow may become progressively less with each succeeding stage.

According to the third embodiment of the invention, the capacitance of the wire 52 is selected to become progressively smaller in each succeeding stage. Thus, the effective capacitance of the vertical bus control circuit 30 becomes progressively smaller and the rise time of the firing voltage applied to each stage becomes progressively faster. Since a diode fires at lower voltages when the applied voltages rise faster, the diodes in each succeeding stage fire at a lower voltage.

By a combination of the three embodiments of the invention, energy may be used in one matrix and then passed on to the next succeeding matrix in a steplike manner. By limiting the energy applied to the next succeeding stage, a restricted number of diodes may be made to fire in that stage, and to hold for a limited period of time. This way, no offensive levels of fan-out current are possible.

These characteristics may vary with the details of any given network; however, I have used firing voltages having rise times of 600; 800; 1200 volts/micro sec. at the points represented by the curve inflections 33, 36, 39 respectively. The capacitance of the leads 52 has been in the range of 25—500 picofarads. The crosspoint diodes have been designed to fire in the range of 5—6 volts.

While the principles of the invention have been described above in connection with specific apparatus and applications, it is to be understood that this description is made only by way of example and not as a limitation on the scope of the invention.

I claim:

1. An electronic switching network comprising a plurality of cascaded switching stages, each of said stages having a number of crosspoints, means at each crosspoint operative to complete a path therethrough, the crosspoint operating means in each stage having been selected as possessing operating characteristics responsive to a voltage level which is lower than the voltage level required to operate crosspoint operating means in the next preceding stage, and means responsive to the operation of any crosspoint operating means for transferring energy to the next stage at a voltage level which is required to operate a limited number of the crosspoint operating means in that stage.

2. The network of claim 1 wherein said crosspoints operating means operate and remain operative for a period of time fixed by the voltage level at which the crosspoint operates.

3. The network of claim 1 wherein the crosspoint operating means comprise semiconductor devices having two emitter-base junctions, and wherein relative efficiencies of the two emitter-base junctions determine the operating characteristics, and further including means controlled by said relative efficiencies for limiting the current flowing through said crosspoints.

4. The network of claim 1 wherein said crosspoints operating means comprise semiconductor devices having a plurality of anodes, one of said anodes being associated with a PNPN layer diffused in said semiconductor device, and another of said anodes being associated with a zener diode diffused within one of the PNPN layers.

5. The network of claim 1 wherein said crosspoint operating means comprise a plurality of multilayer devices diffused in a semiconductor material, and including a plurality of interconnection wires running between corresponding layers on said operating means for connecting them in multiples, the interconnections between each stage having predetermined resistance and capacitance characteristics to establish predetermined selected interstage time constants and the predetermined selected rise time of voltages applied from one stage to the next.

6. A switching network comprising a plurality of cascaded stages of monolithic matrices, each matrix including a plurality of integrated circuit crosspoint devices therein, means for operating crosspoint devices for transmitting energy in a path through said stages in a step manner, the devices in a stage transmissive of energy therethrough in a lesser amount than the energy transmitted thereto, for restricting the number of crosspoint devices which can operate by restricting the available energy level to the successive stage.

7. The network of claim 6 wherein said restricted number is selected to enable an operated crosspoint device in any stage to scan a few possible paths through crosspoint devices in each succeeding stage without enabling an undue number of crosspoint devices to operate simultaneously in such succeeding stages.

8. The network of claim 6 wherein each monolithic matrix comprises a substrate having a boundary layer thereon, semiconductive material above said boundary layer, the resistivity of said material reducing in a smooth gradient from a relatively high level at said boundary layer to a relatively low level at the surface of said matrix, and means for diffusing layers of crosspoint devices of different stages at different depths in said material whereby the efficiencies of junctions of said layers are controlled by the resistivity of the semiconductor materials at the depths to which said layers are diffused.

9. The network of claim 8 wherein the thickness of certain of said layers is selected to further control the efficiency of said junctions at predetermined depths in said semiconductive material.